United States Patent
Kaule et al.

(10) Patent No.: US 6,344,261 B1
(45) Date of Patent: Feb. 5, 2002

(54) PRINTED DOCUMENT HAVING A VALUE AND COMPRISING A LUMINESCENT AUTHENTICITY FEATURE BASED ON A HOST LATTICE

(75) Inventors: Wittich Kaule, Emmering; Gerhard Schwenk, Puchheim; Gerhard Stenzel, Germering, all of (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 09/381,641
(22) PCT Filed: Jan. 29, 1999
(86) PCT No.: PCT/EP99/00594
   § 371 Date: Dec. 6, 1999
   § 102(e) Date: Dec. 6, 1999
(87) PCT Pub. No.: WO99/38701
   PCT Pub. Date: Aug. 5, 1999

(30) Foreign Application Priority Data

Feb. 2, 1998 (DE) .......................... 198 04 021

(51) Int. Cl.⁷ .............................. B32B 3/00; B32B 5/02
(52) U.S. Cl. .................... 428/195; 428/537.5; 428/690; 428/913; 428/916; 283/72; 283/57; 283/901; 283/904; 252/301.4 R
(58) Field of Search .................. 428/67, 199, 203, 428/204, 201, 211, 333, 403, 464, 537.5, 690, 913, 916; 283/74, 57, 904, 901, 113, 114, 107; 427/7, 57; 252/301.4 R

(56) References Cited

U.S. PATENT DOCUMENTS

| | | | | | |
|---|---|---|---|---|---|
| 4,183,989 A | * | 1/1980 | Tooth | .......................... | 428/195 |
| 4,451,521 A | * | 5/1984 | Kaule et al. | ................. | 428/199 |
| 4,452,843 A | * | 6/1984 | Kaule et al. | ................. | 428/199 |
| 4,598,205 A | * | 7/1986 | Kaule et al. | ............. | 250/458.1 |
| 5,005,873 A | * | 4/1991 | West | ........................... | 283/92 |
| 5,599,578 A | * | 2/1997 | Butland | ......................... | 427/7 |
| 5,651,615 A | * | 7/1997 | Hurier | ......................... | 283/92 |

OTHER PUBLICATIONS

Grant and Hackh's Chemical Dictionary, Roger Grant and Claire Grant, McGraw–Hill Book Company, 5th edition, p. 13.*

* cited by examiner

Primary Examiner—Deborah Jones
Assistant Examiner—Gwendolyn Blackwell-Rudasill
(74) Attorney, Agent, or Firm—Bacon & Thomas

(57) ABSTRACT

The invention concerns a printed valuable document with at least one authentication feature in the form of a luminescent substance based on a host lattice doped with at least one rare earth metal. The host lattice largely absorbs in the entire visible region of the spectrum, is excitable in large parts of the visible region of the spectrum and at least partially transparent in at least the wavelength range between 0.8 μm and 1.1 μm. In addition, the host lattice contains chromium as an absorptive substance in such a concentration that amplification of the emission by the luminescent substance takes place. The rare earth metal emits in the wavelength region between 0.8 μm and 1.1 μm.

39 Claims, 3 Drawing Sheets

Figure 1:
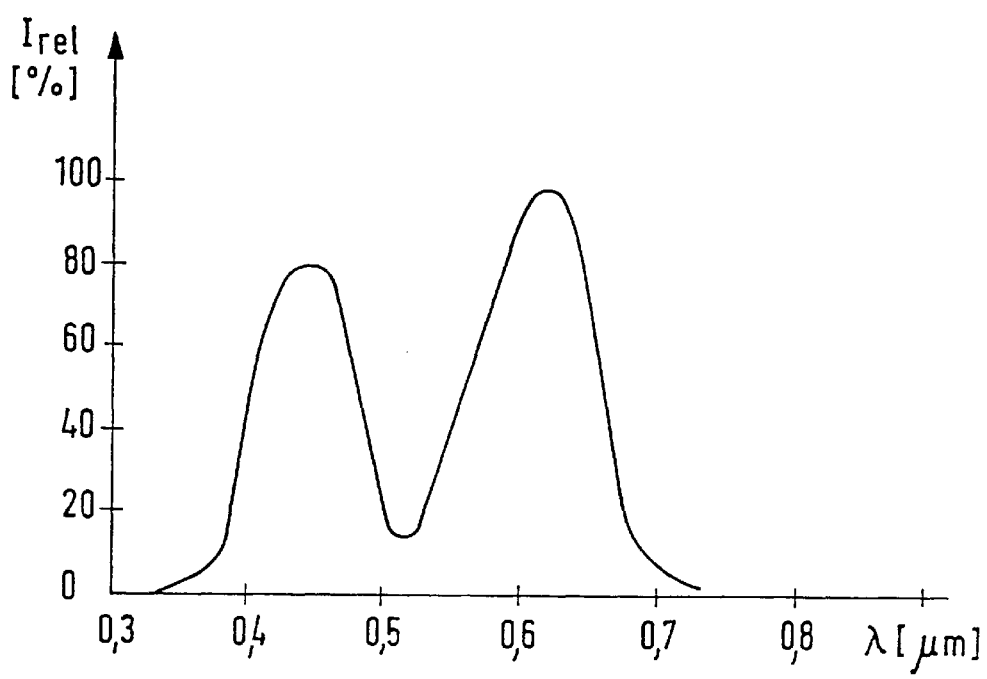

PRINTED DOCUMENT HAVING A VALUE AND COMPRISING A LUMINESCENT AUTHENTICITY FEATURE BASED ON A HOST LATTICE

The invention concerns a printed valuable document with at least one authentication feature in the form of a luminescent substance based on a host lattice doped with at least one rare earth metal.

The protection of valuable documents by means of luminescent substances has long been known. The use of rare earth elements in this connection has also been discussed. These have the advantage of possessing narrow band emission lines in the infrared spectral region that are particularly characteristic and can therefore be safely distinguished from the emissions of other substances. These luminescent substances on the basis of rare earth metals usually involve a host lattice doped with a rare earth metal. In order to detect this luminescent substance, it is exposed to a light source whose emission spectrum largely overlaps the excitation spectrum of the rare earth metal and therefore selectively detects the emission lines produced by the luminescent substance.

In order to enhance the emission intensity of the luminescent substance, it has also already been suggested that co-activated luminous materials be used. These contain the two rare earth metals neodymium (Nd) and ytterbium (Yb) as activators. In this case, the Nd is selectively excited by means of a GaAs diode in the 800 nm region, and it then transfers the absorbed energy with a high level of efficiency to the Yb and thus induces the emissions from the Yb.

The invention is based on the aim of making available a valuable document with a luminescent substance based on host lattices doped with rare earth metals, which are excitable in the visible spectral region and have a high level of emission intensity in the near IR spectral region.

The fulfillment of this aim is embodied in the features of the non-dependent claims. Further developments of these are the subject of the dependent claims.

The invention is based on the fundamental premise that the emission intensity can be increased if the host lattice itself has absorptive components that absorb across a broad band and transfer this energy with a high degree of efficiency to the luminescent rare earth metals. Preferably, lattices are used for this which, on the one hand, absorb in the entire visible spectral region, but which, on the other hand, are largely transparent in the near IR region. This has the advantage that strong light sources, such as halogen, xenon, arc or flash lamps can be used for excitation of the luminescent substances. At the same time, the host lattice should be optically transparent in the region of the luminescent substance's emission bands. According to the invention, this region lies in the near infrared between 0.8 $\mu$m and 1.1 $\mu$m, so that there is a relatively broad non-absorptive "window", in which the most varied of emission spectra can be implemented.

The host lattice according to the invention contains chromium as the absorptive component. The rare earth metals in this case may be ytterbium, praseodymium or neodymium. The host lattice can also have several rare earth metal dopings.

Preferably the host lattice has a garnet or perovskite structure.

The absorptive host lattice components can be partially replaced with the non-absorptive aluminium. The proportion of aluminium can be used to control the absorption and thus the brightness of the luminescent substance. Luminescent substances of this type can therefore also be used as additives for lighter printing inks.

Further embodiments and advantages of the invention are set out below with the aid of illustrations and examples.

Figure 2:
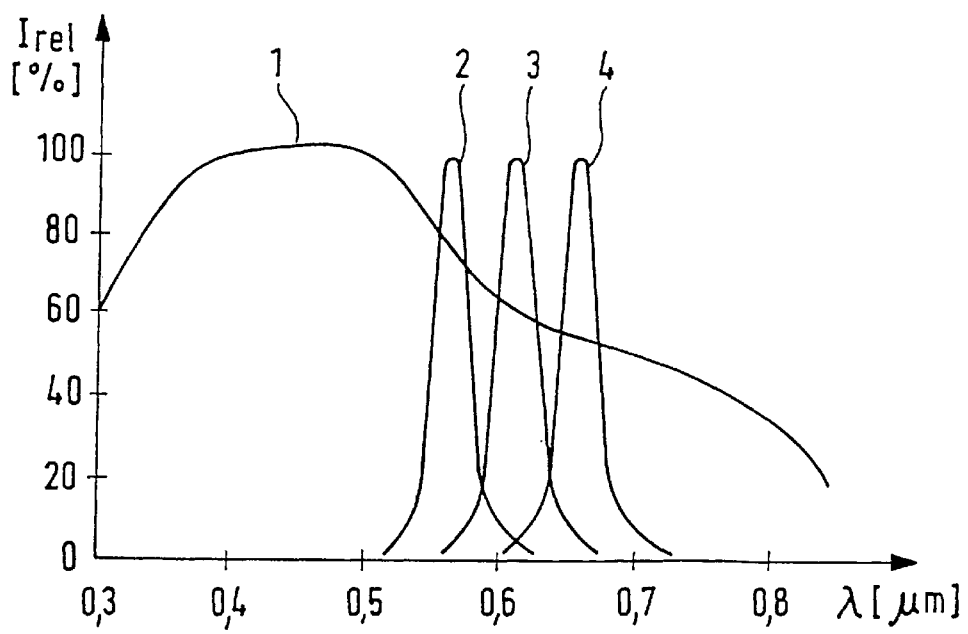
Figure 3:
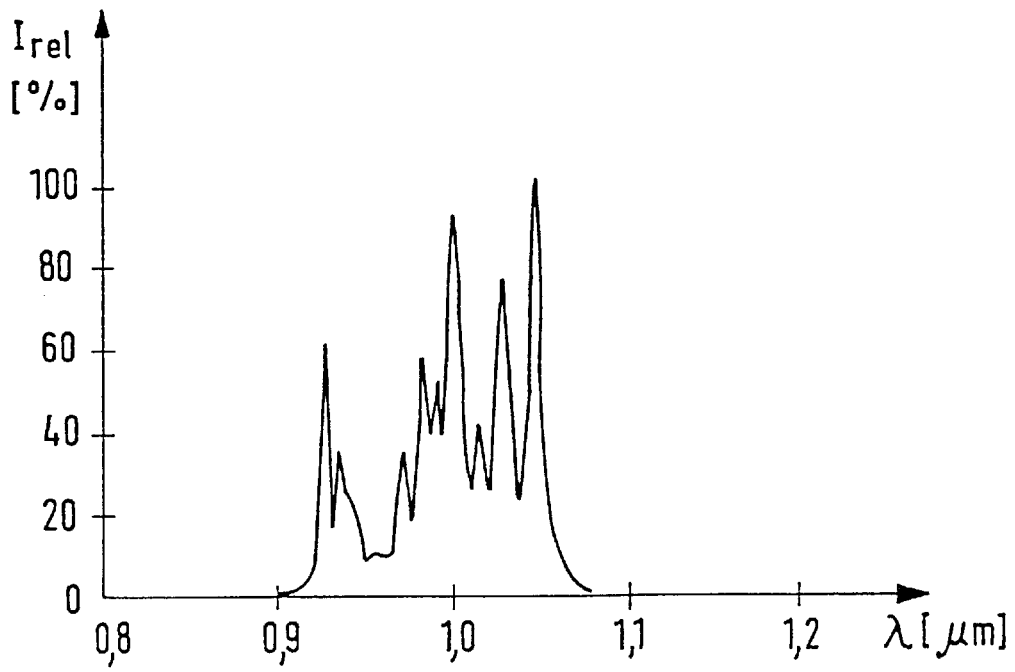
Figure 4:
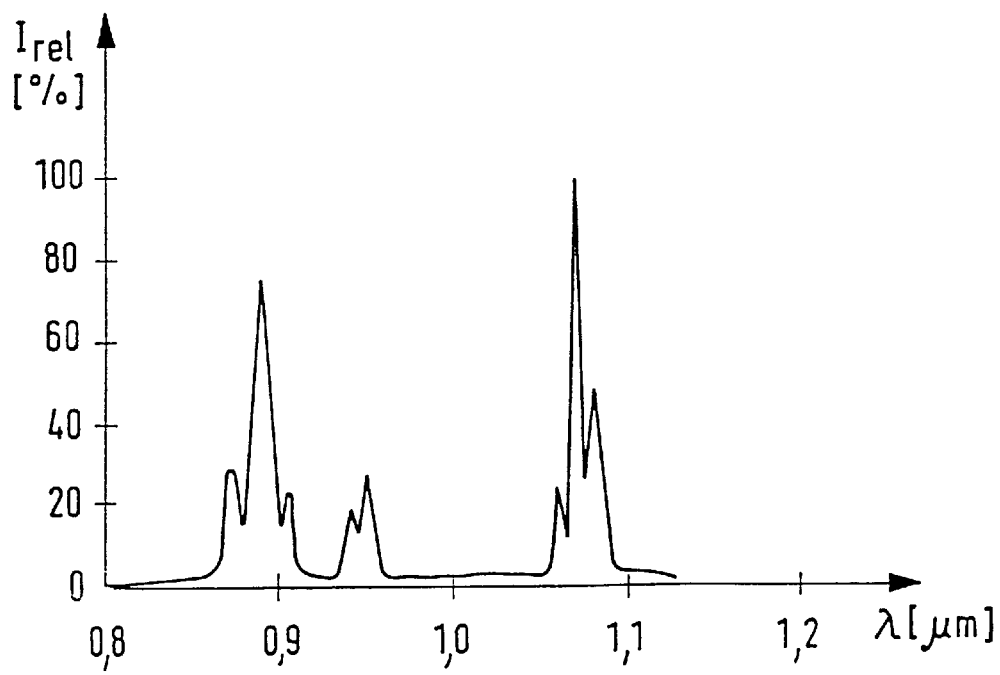
Figure 5:
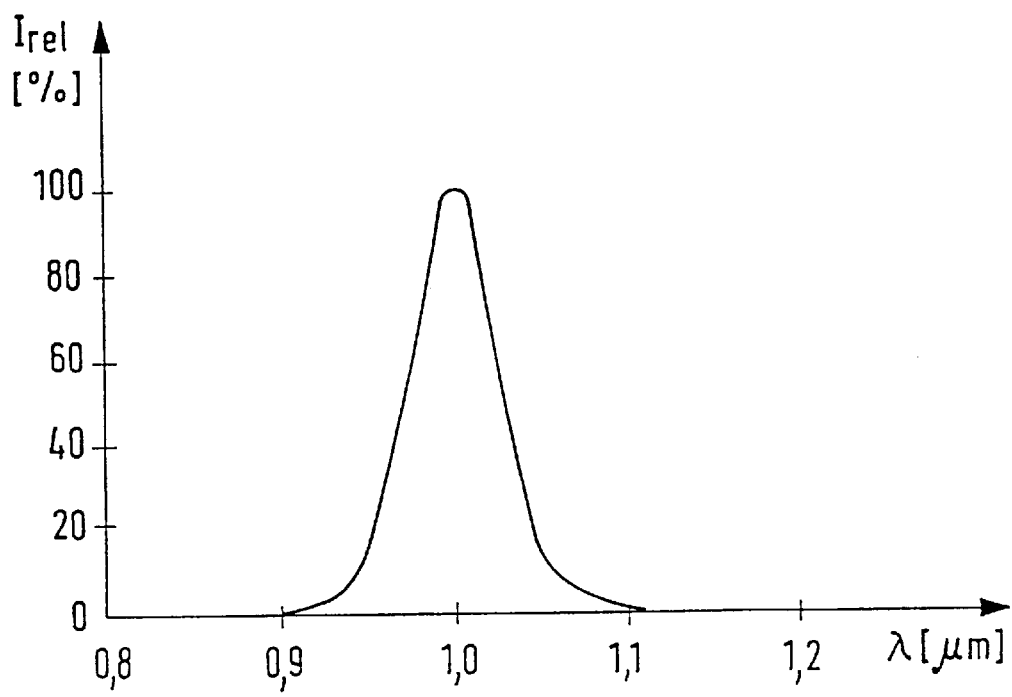
Figure 6:
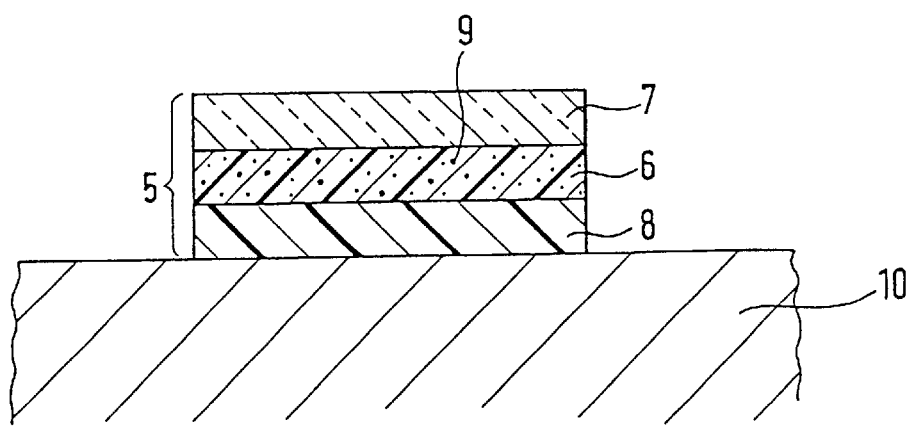

FIG. 1 Excitation spectrum of a luminescent substance according to the invention FIG. 2 Spectra of several light sources FIG. 3 Emission spectrum of a Pr-doped luminescent substance according to the invention FIG. 4 Emission spectrum of a Nd-doped luminescent substance according to the invention FIG. 5 Emission spectrum of a Yb-doped luminescent substance according to the invention FIG. 6 Security element according to the invention in cross section.

FIG. 1 shows the excitation spectrum of a luminescent substance according to the invention. This luminescent substance consists of a chrome-containing host lattice doped with at least one rare earth metal. The host lattice absorbs throughout almost the entire visible spectral region. This very broad band absorption by the host lattice causes the lines from the rare earth metal doping lying in this region to be suppressed. At the same time, an energy transfer takes place from the host lattice to the rare earth metal doping, by means of which the emissions by the luminescent substance are induced. In this way, compared with narrow-band targeted stimulation of individual emission lines, much more effective stimulation of the rare earth metals takes place, also leading to greater emission intensities.

The broad-band absorption by the lattice has the further advantage that strong light sources such as flash lamps can be used for excitation of the luminescent substances, these also producing radiation in the entire visible spectral region.

FIG. 2 shows the spectrum of such a flash lamp with the reference character 1. The spectrum 1 of the flash lamp shown extends continuously from the UV region to the IR region of the spectrum. In some cases, it may be useful to illuminate the luminescent substance only with light in the visible part of the spectrum. In such an instance, the use of light emitting diodes of appropriate wavelength suggests-itself. Light emitting diodes generally have a narrow-band spectrum, so that in order to cover the entire visible spectrum, several light emitting diodes are necessary. FIG. 2 shows the spectra 2, 3 and 4 of a green, orange and red light emitting diode, which just overlap, so that the entire visible spectral region is covered.

FIGS. 3, 4 and 5 show the emission spectra of individual luminescent substances according to the invention.

FIG. 3 shows the emission spectrum of a Pr-doped host lattice. The spectrum extends from about 0.9 $\mu$m to about 1.08 $\mu$m. It has a very characteristic number of emission peaks, which can be evaluated very well as an authentication feature.

FIG. 4 shows the characteristic spectrum of a Nd-doped host lattice. This spectrum has two relatively strong emission peaks in the wavelength region of about 0.9 $\mu$m and just under 1.1 $\mu$m. There is also a somewhat smaller peak in the region of 0.95 $\mu$m.

The spectrum of a Yb-doped host lattice shown in FIG. 5, however, is highly symmetrical and shows just one peak, whose maximum lies at a wavelength of about 1 $\mu$m.

Common to all these lattices according to the invention is that they possess a very noticeable luminescence emission in the near infrared, that is, in the region between 0.8 $\mu$m and 1.1 $\mu$m. Although all three emission spectra belong to the same spectral region, they differ so markedly from each other that they can be clearly differentiated with measuring technology.

In order to achieve the greatest possible effectiveness from the rare earth metals, in the case of a garnet structure, host lattices with the general formula $$A_3Cr_{5-x}Al_xO_{12}$$

are used, whereby A stands for an element from the group scandium (Sc), yttrium (Y), the lanthanides and the actinides, and the index x fulfils the condition 0<x<5. Preferably, the index is in the range between 0.3 and 2.5.

A preferred embodiment of the luminescent substance according to the invention in a garnet structure is $$Y_{3-z}D_zCr_{5-x}Al_xO_{12}$$

where D stands for neodymium, praseodymium or ytterbium and the index z fulfils the condition 0<z<1.

If the host lattice has a perovskite structure, this can be described with the general formula $$ACrO_3$$

where A stands for an element from the group yttrium, scandium and the lanthanides.

A preferred embodiment of the luminescent substance according to the invention in a perovskite structure can be described with the formula $$Y_{1-z}D_zCrO_3$$

where D stands for one of the elements neodymium, praseodymium and ytterbium and the index z fulfils the condition 0<z<1.

According to a further embodiment, the respective host lattices can also be doped with several rare earth metals.

Several examples of the luminescent substance according to the invention are set out in detail below.

EXAMPLE 1

Manufacture of ytterbium/neodymium-activated yttrium-chromium-aluminium mixed garnet ($Y_{2.75}Nd_{0.05}Yb_{0.2}Cr_{0.8}Al_{4.2}O_{12}$): 49.04 g yttrium oxide ($Y_2O_3$), 1.33 g neodymium oxide ($Nd_2O_3$), 6.22 g ytterbium oxide ($Yb_2O_3$), 9.6 g chromium oxide ($Cr_2O_3$), 33.81 g aluminium oxide ($Al_2O_3$) and 100 g desiccated sodium sulphate ($Na_2SO_4$) are mixed together intimately and heated in a corundum crucible to 1100° C. for 12 hours.

Following cooling, the reaction product is ground, the fluxing agent washed out, sodium chromate side-product reduced with sulphuric acid/iron (II) sulphate to chromium (III) sulphate, and then the product is air dried at 100° C. In order to achieve the finest possible grain size, the powder is subsequently milled in water with a stirring ball mill until an average grain size of less than 1 μm is produced.

After filtration and drying, a light green powder results.

EXAMPLE 2

Manufacture of ytterbium-activated yttrium-chromium-perovskite ($Y_{0.85}Yb_{0.15}CrO_3$):

47.62 g yttrium oxide ($Y_2O_3$), 37.71 g chromium oxide ($Cr_2O_3$), 14.66 g ytterbium oxide ($Yb_2O_3$) and 100 g desiccated sodium sulphate ($Na_2SO_4$) are intimately mixed and heated in a corundum crucible to 1100° C. for 20 hours.

Following cooling, the reaction product is ground, the fluxing agent washed out with water, sodium chromate formed as a side-product is reduced with sulphuric acid/iron (II) sulphate to chromium (III) sulphate, and the product is then air dried at 100° C. In order to achieve the finest possible grain size, the powder is subsequently milled accordingly in water with a stirring ball mill.

After filtration and drying, a light green powder with an average grain size of less than 1 μm results.

EXAMPLE 3

Manufacture of neodymium-activated yttrium-aluminium-chromium mixed garnet ($Y_{2.91}Nd_{0.09}Cr_{1.6}Al_{3.4}O_{12}$):

51.45 g yttrium oxide ($Y_2O_3$), 27.14 g aluminium oxide ($Al_2O_3$), 19.04 g chromium (III) oxide ($Cr_2O_3$), 2.37 g neodymium oxide ($Nd_2O_3$) and 100 g desiccated sodium sulphate ($Na_2SO_4$) are intimately mixed and heated in a corundum crucible to 1100° C. for 12 hours.

Following cooling, the reaction product is ground, the fluxing agent washed out with water, sodium chromate formed as a side-product is reduced with sulphuric acid/iron (II) sulphate to chromium (III) sulphate, the product is filtered and then air dried at 100° C. In order to achieve the finest possible grain size, the powder is subsequently milled accordingly in water in a stirring ball mill.

After filtering and drying, a light green powder with an average grain size of less than 1 μm results.

EXAMPLE 4

Manufacture of ytterbium-activated yttrium-aluminium-chromium mixed garnet ($Y_{2.7}Yb_{0.3}Cr_{1.8}Al_{3.2}O_{12}$):

45.92 g yttrium oxide ($Y_2O_3$), 24.57 g aluminium oxide ($Al_2O_3$), 20.61 g chromium (III) oxide ($Cr_2O_3$), 8.9 g ytterbium oxide ($Yb_2O_3$) and 100 g desiccated sodium sulphate ($Na_2SO_4$) are intimately mixed and heated in a corundum crucible to 1100° C. for 12 hours.

Following cooling, the reaction product is ground and the fluxing agent washed out with water, sodium chromate formed as a side-product is reduced with sulphuric acid/iron (II) sulphate to chromium (III) sulphate, after which the product is filtered and air dried at 100° C. In order to achieve the finest possible grain size, the powder is subsequently milled accordingly in water with a stirring ball mill.

After filtration and drying, a light green powder with a mean grain size of less than 1 μm results.

EXAMPLE 5

Manufacture of praseodymium-activated yttrium-aluminium-chromium mixed garnet ($Y_{2.9}Pr_{0.09}Cr_2Al_3O_2$):

50.68 g yttrium oxide ($Y_2O_3$), 23.59 g aluminium oxide ($Al_2O_3$), 23.45 g chromium (III) oxide ($Cr_2O_3$), 2.29 g praseodymium oxide ($Pr_2O_3$) and 100 g desiccated sodium sulphate ($Na_2SO_4$) are intimately mixed and heated in a corundum crucible to 1100° C. for 12 hours.

Following cooling, the reaction product is ground, the fluxing agent washed out with water, sodium chromate formed as a side-product is reduced with sulphuric acid/iron (II) sulphate to chromium (III) sulphate, and the product is air dried at 100° C. In order to achieve the finest possible grain size, the powder is subsequently milled accordingly in water with a stirring ball mill.

After filtration and drying, a light green powder with an average grain size of less than 1 μm results.

The luminescent substances can be applied to the valuable document in a variety of ways. For example, the luminescent substances can be added to a printing ink, which also contains colours visible to the eye. The luminescent substances can be mixed into paper pulp. The luminescent substances can also be provided on or in a plastic substrate which, for instance, is at least partially embedded in a paper pulp. The substrate can take the form of a security thread, a mottling thread or a planchet.

The plastic or paper substrate material can, however, also be attached to any other required object, for instance within the scope of product security measures. The substrate material in this case is preferably made in the form of a label. If the substrate is a component part of the object to be secured, as is the case with tear-off threads, naturally any other shape is also possible. In particular applications, it may be useful to provide the luminescent substance as an invisible layer on the valuable document. It might be present over the whole surface, or in the form of particular patterns, such as stripes, lines, circles or alphanumeric signs.

The designation "valuable document" within the scope of the invention denotes bank notes, cheques, shares, stamps, identification papers, credit cards, passes and other documents, as well as labels, seals, packaging or other items for product security.

FIG. 6 shows an embodiment of the security element according to the invention. The security element consists in this case of a label 5, which comprises a-paper or plastic layer 6, a transparent covering layer 7, and an adhesive layer 8. This label 5 is linked to any desired substrate 10 by means of the adhesive layer 8. This substrate 10 may be a valuable document, identification paper, pass, certificate or similar, or it may be another object to be secured, such as a CD, packaging or similar.

In this example, the luminescent substance 9 is contained within the volume of layer 6. If the layer 6 is a layer of paper, the concentration of luminescent substance is between 0.05 and 1 percent by weight.

Alternatively, the luminescent substance could be contained within a printing ink not shown here, which is printed onto one of the label layers, preferably on the surface of layer 6. The concentration of luminescent substance in the printing ink varies in this case between 10 and 40 percent by weight.

Instead of providing the luminescent substance within or on a substrate material which is then attached as a security element to an object, it is also possible according to the invention to provide the luminescent substance directly within the valuable document to be secured or on its surface in the form of a coating.

What is claimed is:

1. Printed valuable document with at least one authentication feature comprising a luminescent substance based on a host lattice doped with at least one rare earth metal, which largely absorbs throughout the visible region of the spectrum, is excitable in substantial parts of the visible region of the spectrum, and is at least partially transparent at least in the wavelength range between 0.8 $\mu$m and 1.1 $\mu$m, whereby the rare earth metal emits in the wavelength range between 0.8 $\mu$m and 1.1 $\mu$m, and the host lattice contains chromium as an absorptive substance in such a concentration that amplification of the emission by the luminescent substance takes place.

2. Printed valuable document according to claim 1, wherein the rare earth metal is ytterbium, praseodymium or neodymium.

3. Printed valuable document according to claim 1, wherein the host lattice has only one rare earth metal doping.

4. Printed valuable document according to claim 1, wherein the chromium concentration lies in the range from 2 to 30 percent by weight.

5. Printed valuable document according to claim 1, wherein the rare earth metal is present in a concentration between 0.5 and 20 percent by weight.

6. Printed valuable document according to claim 1, wherein the host lattice has a garnet or perovskite structure.

7. Printed valuable document according to claim 6, wherein the garnet structure satisfies with the general formula $$A_3Cr_{5-x}Al_xO_{12}$$

where A stands for an element selected from the group consisting of scandium, yttrium, the lanthanides and the actinides, and the index x fulfils the condition $0<x<4.99$.

8. Printed valuable document according to claim 7, wherein the index x fulfils the condition $0.3<x<2.5$.

9. Printed valuable document according to claim 7, wherein the luminescent substance satisfies the formula $$Y_{3-z}Nd_zCr_{5-x}Al_xO_{12}$$

where the index z fulfils the condition $0<z<1$.

10. Printed valuable document according to claim 7, wherein the luminescent substance satisfies the formula $$Y_{3-z}Yb_zCr_{5-x}Al_xO_{12}$$

where the index z fulfils the condition $0<z<1$.

11. Printed valuable document according to claim 7, wherein the luminescent substance satisfies the formula $$Y_{3-z}Pr_zCr_{5-x}Al_xO_{12}$$

where the index z fulfils the condition $0<z<1$.

12. Printed valuable document according to claim 6, wherein the perovskite structure satisfies the general formula $$ACrO_3$$

where A stands for an element selected from the group consisting of yttrium, scandium and the lanthanides.

13. Printed valuable document according to claim 12, wherein the luminescent substance satisfies the general formula $$Y_{1-z}Nd_zCrO_3$$

where the index z fulfils the condition $0<z<1$.

14. Printed valuable document according to claim 12, wherein the luminescent substance satisfies the general formula $$Y_{1-z}Yb_zCrO_3$$

where the index z fulfils the condition $0<z<1$.

15. Printed valuable document according to claim 12, wherein the luminescent substance satisfies the general formula $$Y_{1-z}Pr_zCrO_3$$

where the index z fulfils the condition $0<z<1$.

16. Printed valuable document according to claim 1, wherein the luminescent substance is mixed with a printing ink that also contains visible colour additions.

17. Printed valuable document according to claim 1, wherein the luminescent substance is incorporated into the volume of the valuable document.

18. Printed valuable document according to claim 1, wherein the luminescent substance is provided as an invisible and at least partial coating on the valuable document.

19. Printed valuable document according to claim 18, wherein the coating is in the form of a stripe.

20. Security element having at least one substrate material and a luminescent substance based on a host lattice doped with at least one rare earth metal, which largely absorbs in the visible region of the spectrum, is excitable in substantial parts of the visible spectrum and is at least partially transparent at least in the wavelength region between 0.8 μm and 1.1 μm, whereby the rare earth metal emits in the wavelength range between 0.8 μm and 1.1 μm, and the host lattice contains chromium as the absorptive substance in such a concentration that amplification of the emission of the luminescent substance results.

21. Security element according to claim 20, wherein the luminescent substance is incorporated into the substrate material.

22. Security element according to claim 21, wherein the luminescent substance is present in the substrate material in a concentration between 0.01 and 10 percent by weight.

23. Security element according to claim 20, wherein the luminescent substance is present in a layer applied to the substrate material.

24. Security element according to claim 23, wherein the luminescent substance is present in a printing ink in a concentration between 0.5 and 40 percent by weight.

25. Security element according to claim 20, wherein the substrate material consists of plastic.

26. Security element according to claim 20, wherein the substrate material consists of paper.

27. Security element according to claim 20, wherein the substrate material is formed as a security thread, mottling thread, planchet or label.

28. Printed valuable document according to claim 4, wherein the chromium concentration lies in the range from 5 to 15 percent by weight.

29. Printed valuable document according to claim 5, wherein the rare earth metal is present in a concentration between 0.8 and 13 percent by weight.

30. Printed valuable document according to claim 8, wherein the index x fulfils the condition $0.5<x<2$.

31. Printed valuable document according to claim 9, wherein the luminescent substance satisfies the formula $$Y_{3-z}Nd_zCr_{5-x}Al_xO_{12}$$

where the index z fulfils the condition $0.02<z<0.1$.

32. Printed valuable document according to claim 10, wherein the luminescent substance satisfies the formula $$Y_{3-z}Yb_zCr_{5-x}Al_xO_{12}$$

where the index z fulfils the condition $0.05<z<0.3$.

33. Printed valuable document according to claim 11, wherein the luminescent substance satisfies the formula $$Y_{3-z}Pr_zCr_{5-x}Al_xO_{12}$$

where the index z fulfils the condition $0.01<z<0.5$.

34. Printed valuable document according to claim 13, wherein the luminescent substance satisfies the general formula $$Y_{1-z}Nd_zCrO_3$$

where the index z fulfils the condition $0.01<z<0.2$.

35. Printed valuable document according to claim 14, wherein the luminescent substance satisfies the general formula $$Y_{1-z}Yb_zCrO_3$$

where the index z fulfils the condition $0.1<z<0.5$.

36. Printed valuable document according to claim 15, wherein the luminescent substance satisfies the general formula $$Y_{1-z}Pr_zCrO_3$$

where the index z fulfils the condition $0.001<z<0.1$.

37. Printed valuable document according to claim 17, wherein the luminescent substance is incorporated into the valuable document which consists of paper.

38. Security element according to claim 22, wherein the luminescent substance is present in the substrate material in a concentration between 0.1 and 5 percent by weight.

39. Security element according to claim 24, wherein the luminescent substance is present in a printing ink in a concentration between 20 and 30 percent by weight.

* * * * *